July 16, 1929.  T. O'BRIEN  1,721,131

FLANK SPREADER

Filed May 18, 1928

Witness
Martin H. Olsen

Inventor
Thomas O'Brien
By Rummler & Rummler
Attys.

Patented July 16, 1929.

1,721,131

UNITED STATES PATENT OFFICE.

THOMAS O'BRIEN, OF CHICAGO, ILLINOIS, ASSIGNOR TO SWIFT & COMPANY, OF CHICAGO, ILLINOIS, A CORPORATION OF ILLINOIS.

FLANK SPREADER.

Application filed May 18, 1928. Serial No. 278,799.

This invention relates to devices used in the meat packing industry for mechanically holding a side of meat in the desired form during the chilling operation so that the meat does not set in distorted forms.

A purpose of the invention is to provide a device of this class which is particularly useful for application to the sides of hogs between the backbone and flanks, to insure a smooth flank. It is also an object of the invention to provide a flank spreader which is highly effective for its intended work but simple in construction and which may be economically produced in quantity.

The objects of the invention are accomplished by means of a construction as shown in the accompanying drawings in which.

Figure 1:
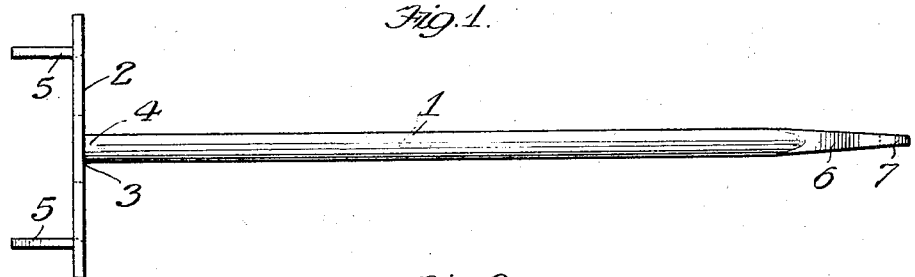
Fig. 1 is a plan view of the spreader.
Figure 2:
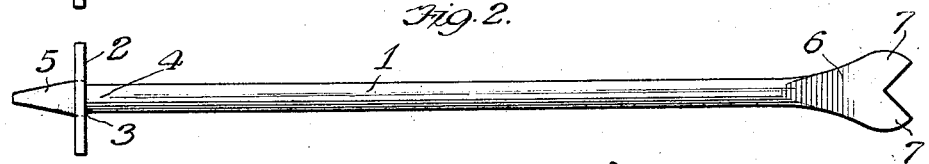
Fig. 2 is an end view.
Figure 3:
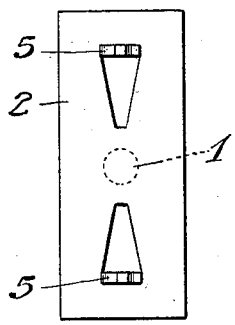
Fig. 3 is a side view.
Figure 4:
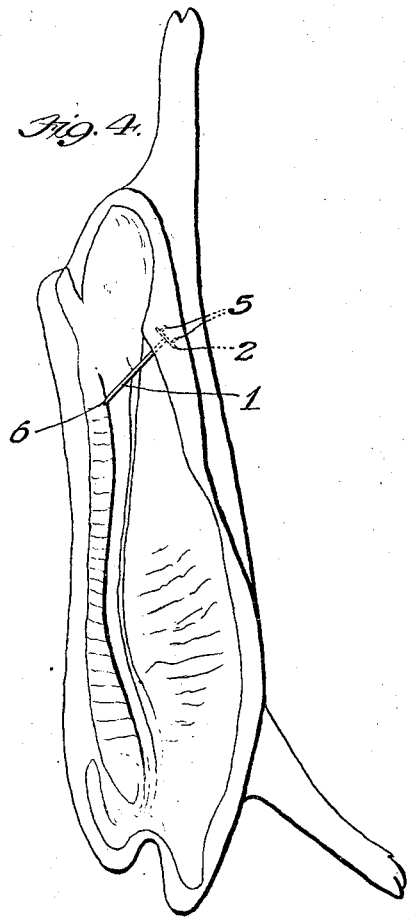
Fig. 4 shows the application of the spreader to a hog half.

The spreader shown consists of two parts, a rod 1 and a bearing plate 2 centrally welded at 3 to the end 4 of the rod. Triangular prongs 5 are pressed outwardly from the bearing plate 2. The purpose of prongs 5 is to prevent the bearing plate 2 from slipping where it engages the inside of the flank. The opposite end 6 of the rod is flattened into fish tail form to provide a pair of prongs 7 for embracing the backbone of the animal, as shown in Fig. 4. The prongs 7 are in a plane at right angles to plane of prongs 5.

In using the device, the animal flank is held extended away from the backbone by engaging the fish tail end of the spreader with the backbone, and the bearing head 2 with the inside of the flank as shown in Fig. 4. The device remains in place during the cooling operation and the flank sets substantially free from wrinkles.

Although but one specific embodiment of this invention has been herein shown and described, it will be understood that details of the construction shown may be altered or omitted without departing from the spirit of this invention as defined by the following claim.

I claim:

A flank spreader comprising a single rod, a bearing plate mounted on one end of said rod extending transversely thereof, spaced prongs extending from said plate located on opposite sides of said rod, and a flattened section on the other end of said rod comprising a forked extremity, the prongs of said flattened section being located in a plane substantially perpendicular to the plane defined by the prongs on said plate.

Signed at Chicago this 19th day of April, 1928.

THOMAS O'BRIEN.